(12) United States Patent
Lin (10) Patent No.: US 10,631,318 B2
(45) Date of Patent: Apr. 21, 2020

(54) RESOURCE DIVISION METHOD AND APPARATUS

(71) Applicant: Huawei Technologies Co., Ltd., Shenzhen (CN)

(72) Inventor: Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/024,188

(22) Filed: Jun. 29, 2018

(65) Prior Publication Data

US 2018/0310328 A1 Oct. 25, 2018

Related U.S. Application Data

(63) Continuation of application No. PCT/CN2016/110793, filed on Dec. 19, 2016.

(30) Foreign Application Priority Data

Dec. 31, 2015 (CN) .......................... 2015 1 1028190

(51) Int. Cl.
*H04W 72/12* (2009.01)
*H04L 5/00* (2006.01)
*H04W 72/04* (2009.01)

(52) U.S. Cl.
CPC ....... *H04W 72/1263* (2013.01); *H04L 5/0035* (2013.01); *H04W 72/0493* (2013.01);
(Continued)

(58) Field of Classification Search
CPC .... H04W 76/11; H04L 5/0048; H04L 5/0073; H04L 5/0035; H04B 17/336
See application file for complete search history.

(56) References Cited

U.S. PATENT DOCUMENTS

2010/0069063 A1 3/2010 Osterling et al.
2011/0249642 A1 10/2011 Song et al.
(Continued)

FOREIGN PATENT DOCUMENTS

CN 101536563 A 9/2009
CN 102656917 A 9/2012
(Continued)

OTHER PUBLICATIONS

NGMN Alliance, "Further Study on Critical C-RAN Technologies", Version 1.0, Mar. 31, 2015, 93 pages.
(Continued)

*Primary Examiner* — Ayaz R Sheikh
*Assistant Examiner* — Debebe A Asefa
(74) *Attorney, Agent, or Firm* — Fish & Richardson P.C.

(57) ABSTRACT

A resource division method includes: dividing, by a second node, a radio resource of a first node into a first resource and a second resource; and if determining that a terminal device is scheduled by the second node, sending, by the second node, a data packet that has been processed by a scheduling function and third resource indication information to the first node, where a third resource indicated by the third resource indication information is a part of or all of the second resource, and the third resource indication information is used for instructing the first node to send, after processing the data packet that has been processed by using the scheduling function, the data packet that has been processed by the first node to the terminal device by using the third resource.

20 Claims, 4 Drawing Sheets

(52) U.S. Cl.
CPC ...... *H04W 72/1273* (2013.01); *H04W 72/048* (2013.01); *H04W 72/0426* (2013.01)

(56) References Cited

U.S. PATENT DOCUMENTS

| | | | |
|---|---|---|---|
| 2012/0188953 A1 | 7/2012 | Won et al. | |
| 2012/0195284 A1 | 8/2012 | Mann et al. | |
| 2012/0201159 A1* | 8/2012 | Morita | H04W 72/082 370/252 |
| 2013/0017852 A1 | 1/2013 | Liu et al. | |
| 2014/0082431 A1* | 3/2014 | Oizumi | H04L 1/0061 714/48 |

FOREIGN PATENT DOCUMENTS

| | | |
|---|---|---|
| CN | 102907135 A | 1/2013 |
| CN | 102907167 A | 1/2013 |
| CN | 104244415 A | 12/2014 |
| EP | 2525623 A2 | 11/2012 |
| EP | 2890194 A1 | 7/2015 |
| WO | 2014101236 A1 | 7/2014 |

OTHER PUBLICATIONS

Alcatel-Lucent et al., "Modelling of communication constraints between CoMP transmission points", 3GPP TSG-RAN WG1 #64, Taipei, Feb. 21-25, 2011, 6 pages, R1-110805.
Office Action issued in Chinese Application No. 201511028190.9 dated Feb. 3, 2020, 6 pages.

* cited by examiner

RESOURCE DIVISION METHOD AND APPARATUS

CROSS-REFERENCE TO RELATED APPLICATIONS

This application is a continuation of International Application No. PCT/CN2016/110793 filed on Dec. 19, 2016, which claims priority to Chinese Patent Application No 201511028190.9 filed on Dec. 31, 2015. The disclosures of the aforementioned applications are hereby incorporated by reference in their entireties.

TECHNICAL FIELD

The present application relates to the field of communications technologies, and in particular, to a resource division method and apparatus.

BACKGROUND

In a Long Term Evolution (LTE) system, there are two types of network architectures: a centralized architecture and a distributed architecture. For the distributed architecture, a base station includes a baseband function and a radio frequency function. For the centralized architecture, a baseband function is placed in a baseband control unit (baseband control unit function is placed in a remote radio unit (RRU), and the baseband control unit (BBU) and the RRU need to be connected to each other by using large-capacity transmission media such as an optical fiber and a microwave. The foregoing two types of architectures are unrelated to a terminal device. That is, once an architecture is determined, all terminal devices in one cell are scheduled in a distributed manner, or scheduled in a centralized manner. The scheduling means allocation of a radio resource, that is, determining a radio resource to be used for receiving or sending data of the terminal device.

In the distributed architecture, scheduling is scheduling within each base station, an effect of coordination between cross-base station cells is not good, and interference between the cross-base station cells is relatively great, causing a throughput of a terminal device at an edge of a cell to decrease. However, an advantage of the distributed architecture is that a bandwidth of a transmission network is saved. Because the BBU and the RRU are integrated, no additional transmission network (Fronthaul) is needed. An advantage of the centralized architecture is that system performance is good. Because radio resources of a plurality of cells are scheduled in a centralized manner (for example, by using a CoMP technology), radio resource coordination between the plurality of cells is implemented, interference is reduced and a throughput of a user at an edge of a cell is increased. However, the BBU is separated from the RRU. Because data that has been processed by a physical (PHY) layer is transmitted between the BBU and the RRU, a large quantity of data needs to be transmitted on a transmission network (generally referred to as Fronthaul) between the BBU and the RRU, a very large number of bandwidths is required. Further, if a frequency bandwidth supported by a cell is increased, more data needs to be sent through an air interface, and a bandwidth requirement of a corresponding transmission network also increased accordingly, bringing heavy pressure to a bandwidth of the transmission network.

In the prior art, the distributed architecture cannot coexist with the centralized architecture. Therefore, it cannot be implemented that system performance is ensured through centralized scheduling at the same time when a bandwidth requirement of a transmission network is reduced through distributed scheduling. The distributed architecture cannot coexist with the centralized architecture mainly due to that if a plurality of nodes are responsible for scheduling a radio resource of one node or a radio resource of one cell, a same transmission resource are scheduled by different nodes, causing a conflict between scheduled resources.

SUMMARY

The present disclosure provides a resource division method and apparatus, to divide a radio resource of a node, so that in a scenario in which distributed scheduling and centralized scheduling coexist, a resource conflict caused by simultaneously scheduling a same transmission resource by a plurality of nodes can be avoided.

According to one aspect, a resource division method is provided, including at least one terminal device, at least one first node, and at least one second node, where both the first node and the second node have a scheduling function, and the method includes:

dividing, by the second node, a radio resource of the first node into a first resource and a second resource; and if determining that the terminal device is scheduled by the second node, sending, by the second node, a data packet that has been processed by using the scheduling function and third resource indication information to the first node, where a third resource indicated by the third resource indication information is a part of or all of the second resource, and the third resource indication information is used for instructing the first node to send, after processing the data packet that has been processed by using the scheduling function, the data packet that has been processed by the first node to the terminal device by using the third resource; and this technical solution, that is, a centralized scheduling manner, is used, so that the terminal device may be scheduled in the centralized manner, and a gain of centralized scheduling can be obtained, for example, interference at an edge of a cell can be reduced; or if the terminal device is scheduled by the first node, sending, by the second node, a data packet that has not been processed by using the scheduling function to the first node, where after processing the data packet that has not been processed by using the scheduling function, the first node sends the data packet that has been processed by the first node to the terminal device by using a fourth resource, and the fourth resource is a part of or all of the first resource; and this technical solution, that is, a distributed scheduling manner, is used, so that a bandwidth requirement of a transmission network can be reduced.

In this embodiment of the present disclosure, the radio resource of the first node is divided into the first resource and the second resource, so that when the first node and the second node schedule respective terminal devices, the first node and the second node use radio resources allocated when the first node and the second node schedule the respective terminal devices, that is, the first node uses the first resource, and the second node uses the second resource, thereby avoiding a scheduling conflict caused by scheduling a same transmission resource by different nodes.

In a possible design, when basic information of the terminal device changes or network information of the second node or the first node changes, the second node negotiates with the first node to divide the radio resource of the first node. By using this technical solution, a running status of the network and a service requirement of the terminal device can be dynamically adapted to.

In another possible design, the third resource indication information includes: radio resource configuration information allocated when the second node schedules the terminal device and a sending moment indication of the data packet that has been processed by using the scheduling function; or includes radio resource configuration information allocated when the second node schedules the terminal device. When the solution includes the sending moment indication, the second node may indicate that there is a transmission delay during data transmission between the first node and the terminal device, so that quality of the data transmission can be more effectively ensured.

In another possible design, the dividing, by the second node, a radio resource of the first node into a first resource and a second resource includes: negotiating, by the second node by using inter-node signaling with the first node, to divide the radio resource of the first node. In this way, resource division between nodes can be dynamically coordinated.

In another possible design, the negotiating, by the second node by using inter-node signaling with the first node, to divide the radio resource of the first node includes three parallel solutions. The first solution includes sending, by the second node, a radio resource division indication to the first node. By using the first solution, centralized coordination performed by the second node can be implemented, that is, the second node coordinates a plurality of first nodes, to determine a first resource of each first node, so that the radio resources of the plurality of first nodes are orthogonal, thereby reducing interference. Alternatively, the second solution includes receiving, by the second node, a radio resource division indication sent by the first node. By using the second solution, when the second node divides a resource, an actual running status of the first node may be considered and is used as a piece of input information, to perform the resource division more precisely. Alternatively, the third solution includes forwarding, by the second node to the first node, a radio resource division indication sent by a radio access network controller. By using the third solution, the radio access network controller can serve as a centralized coordination node, to effectively coordinate the resource division between the first node and the second node.

In another possible design, the radio resource division indication includes a cell identifier or a node identifier of the node for which division is to be performed, and a radio resource division parameter, and the radio resource includes a time domain radio resource, a frequency domain radio resource, or a code domain radio resource.

In another possible design, the radio resource of the first node includes a radio resource that includes at least one cell or at least one cell group; or includes a radio resource that includes at least one component carrier or at least one component carrier group.

According to another aspect, a resource division method is provided, including at least one terminal device, at least one first node, and at least one second node, where both the first node and the second node have a scheduling function, and the method includes:

if it is determined that the terminal device is scheduled by the second node, receiving, by the first node, a data packet that has been processed by using the scheduling function and third resource indication information, where the data packet and the third resource indication information are sent by the second node, and a third resource indicated by the third resource indication information is a part of or all of a second resource, and after processing the data packet that has been processed by using the scheduling function, sending, by the first node, the data packet that has been processed by the first node to the terminal device by using the third resource indicated by the third resource indication information, where this technical solution, that is, a centralized scheduling manner, is used, so that the terminal device may be scheduled in the centralized manner, and a gain of centralized scheduling can be obtained, for example, interference at an edge of a cell can be reduced; or if it is determined that the terminal device is scheduled by the first node, receiving, by the first node, a data packet that has not been processed by using the scheduling function and that is sent by the second node, and after processing the data packet that has not been processed by using the scheduling function, sending, by the first node, the data packet that has been processed by the first node to the terminal device by using a fourth resource, where the fourth resource is a part of or all of a first resource; and this technical solution, that is, a distributed scheduling manner, is used, so that a bandwidth requirement of a transmission network can be reduced.

In this embodiment of the present disclosure, a radio resource of the first node is divided into the first resource and the second resource, so that when the first node and the second node schedule respective terminal devices, the first node and the second node use radio resources that are allocated when the first node and the second node respectively schedule the terminal devices, that is, the first node uses the first resource, and the second node uses the second resource, thereby avoiding a scheduling conflict caused by scheduling a same transmission resource by different nodes.

In a possible design, the method further includes: when basic information of the terminal device changes or network information of the second node or the first node changes, negotiating, by the first node with the second node, to divide the radio resource of the first node. By using this technical solution, a running status of the network and a service requirement of the terminal device can be dynamically adapted to.

In another possible design, the third resource indication information includes: radio resource configuration information allocated when the second node schedules the terminal device and a sending moment indication of the data packet that has been processed by using the scheduling function; or radio resource configuration information allocated when the second node schedules the terminal device. By using this solution, the second node may indicate that there is a transmission delay during data transmission between the first node and the terminal device, so that quality of the data transmission can be more effectively ensured.

In another possible design, after the receiving, by the first node, third resource indication information, the method further includes: determining, by the first node, the first resource based on the third resource indication information. Therefore, data of the terminal device scheduled by the first node may be sent by using the first resource.

In another possible design, the method further includes: negotiating, by the first node by using inter-node signaling with the second node, to divide the radio resource of the first node.

In another possible design, the method further includes: receiving, by the first node, a radio resource division indication sent by the second node, where, by using this solution, centralized coordination performed by the second node can be implemented, that is, the second node coordinates a plurality of first nodes, to determine a first resource of each first node, so that it can be implemented that radio resources of the plurality of first nodes are orthogonal, thereby reducing interference; or sending, by the first node, a radio resource division indication to the second node, where, by using this solution, when the second node divides a resource, an actual running status of the first node may be considered and is used as a piece of input information, to perform the resource division more precisely.

In another possible design, the radio resource division indication includes a cell identifier or a node identifier of the node for which division is to be performed, and a radio resource division parameter, and the radio resource includes a time domain radio resource, a frequency domain radio resource, or a code domain radio resource.

In another possible design, the radio resource of the first node includes a radio resource that includes at least one cell or at least one cell group; or includes a radio resource that includes at least one component carrier or at least one component carrier group.

According to another aspect, an embodiment of this application provides a resource division method, including at least one terminal device, at least one first node, and at least one second node, where both the first node and the second node have a scheduling function, and the method includes:

dividing, by the first node, a radio resource of the first node into a first resource and a second resource; and if it is determined that the terminal device is scheduled by the first node, receiving, by the first node, a data packet that has not been processed by using the scheduling function and that is sent by the second node, and after performing scheduling function processing on the data packet that has not been processed by using the scheduling function, sending, by the first node, the data packet that has been processed by the first node to the terminal device by using a third resource, where the third resource is a part of or all of the first resource; and this technical solution, that is, a distributed scheduling manner, is used, so that a bandwidth requirement of a transmission network can be reduced; or if the terminal device is scheduled by the second node, receiving, by the first node, a data packet that has been processed by using the scheduling function and fourth resource indication information, where the data packet and the fourth resource indication information are sent by the second node, a fourth resource indicated by the fourth resource indication information is a part of or all of the second resource, and the fourth resource indication information is used for instructing the first node to send, after processing data that has been processed by using the scheduling function, the data packet that has been processed by the first node to the terminal device by using the fourth resource; and this technical solution, that is, a centralized scheduling manner, is used, so that the terminal device may be scheduled in the centralized manner, and a gain of centralized scheduling can be obtained, for example, interference at an edge of a cell can be reduced.

In this embodiment of the present disclosure, the radio resource of the first node is divided into the first resource and the second resource, so that when the first node and the second node schedule respective terminal devices, the first node and the second node use radio resources that are allocated when the first node and the second node respectively schedule the terminal devices, that is, the first node uses the first resource, and the second node uses the second resource, thereby avoiding a scheduling conflict caused by scheduling a same transmission resource by different nodes.

In a possible design, the method further includes: when basic information of the terminal device changes or network information of the second node or the first node changes, negotiating, by the first node with the second node, to divide the radio resource of the first node. By using this technical solution, a running status of the network and a service requirement of the terminal device can be dynamically adapted to.

In another possible design, the fourth resource indication information includes: radio resource configuration information allocated when the second node schedules the terminal device; or radio resource configuration information allocated when the second node schedules the terminal device and a sending moment indication of the data packet that has been processed by using the scheduling function. By using this solution, when the second node divides a resource, an actual running status of the first node may be considered and is used as a piece of input information, to perform the resource division more precisely.

In another possible design, the dividing, by the first node, a radio resource of the first node into a first resource and a second resource includes: negotiating, by the first node by using inter-node signaling with the second node, to divide the radio resource of the first node.

In another possible design, the negotiating, by the first node by using inter-node signaling with the second node, to divide the radio resource of the first node includes: sending, by the first node, a radio resource division indication to the second node; or receiving, by the first node, a radio resource division indication sent by the second node; or receiving, by the first node, a radio resource division indication sent by a radio access network controller. By using this solution, the second node may indicate that there is a transmission delay during data transmission between the first node and the terminal device, so that quality of the data transmission can be more effectively ensured.

In another possible design, the radio resource division indication includes a cell identifier or a node identifier of the node for which division is to be performed, and a radio resource division parameter, and the radio resource includes a time domain radio resource, a frequency domain radio resource, or a code domain radio resource.

In another possible design, the radio resource of the first node includes a radio resource that includes at least one cell or at least one cell group; or includes a radio resource that includes at least one component carrier or at least one component carrier group.

According to another aspect, an embodiment of this application provides a resource division method, including at least one first node and at least one second node, where both the first node and the second node have a scheduling function, and the method includes:

dividing, by the second node, a radio resource of the first node into a first resource and a second resource; and if it is determined that the terminal device is scheduled by the first node, sending, by the second node, a data packet that has not been processed by using the scheduling function to the first node, where after performing scheduling function processing on the data packet that has not been processed by using the scheduling function, the first node sends the data packet that has been processed by the first node to the terminal device by using a third resource, where the third resource is a part of or all of the first resource; and this technical solution, that is, a distributed scheduling manner, is used, so that a bandwidth requirement of a transmission network can be reduced; or if the terminal device is scheduled by the second node, sending, by the second node, a data packet that has been processed by using the scheduling function and fourth resource indication information to the first node, where the fourth resource indication information is used for instructing the first node to send, by using a fourth resource, after processing the data packet that has been processed by using the scheduling function, the data packet that has been processed by the first node, and the fourth resource indicated by the fourth resource indication information is a part of or all of the second resource; and this technical solution, that is, a centralized scheduling manner, is used, so that the terminal device may be scheduled in the centralized manner, and a gain of centralized scheduling can be obtained, for example, interference at an edge of a cell can be reduced.

In this embodiment of the present disclosure, the radio resource of the first node is divided into the first resource and the second resource, so that when the first node and the second node schedule respective terminal devices, the first node and the second node use radio resources that are allocated when the first node and the second node respectively schedule the terminal devices, that is, the first node uses the first resource, and the second node uses the second resource, thereby avoiding a scheduling conflict caused by scheduling a same transmission resource by different nodes.

In a possible design, the method further includes: when basic information of the terminal device changes or network information of the second node or the first node changes, negotiating, by the second node with the first node, to divide the radio resource of the first node. By using this technical solution, a running status of the network and a service requirement of the terminal device can be dynamically adapted to.

In another possible design, after the receiving, by the first node, fourth resource indication information, the method further includes: determining, by the first node, the first resource based on the fourth resource indicated by the fourth resource indication information.

In another possible design, the method further includes: negotiating, by the second node by using inter-node signaling with the first node, to divide the radio resource of the first node. By using this method, resource division between nodes can be dynamically coordinated.

In another possible design, the dividing, by the second node, a radio resource of the first node into a first resource and a second resource includes: sending, by the second node, a radio resource division indication to the first node; or receiving, by the second node, a radio resource division indication sent by the first node. By using this method, resource division between nodes can be dynamically coordinated.

In another possible design, the radio resource division indication includes a cell identifier or a node identifier of the node for which division is to be performed, and a radio resource division parameter, and the radio resource includes a time domain radio resource, a frequency domain radio resource, or a code domain radio resource.

In another possible design, the radio resource of the first node includes a radio resource that includes at least one cell or at least one cell group; or includes a radio resource that includes at least one component carrier or at least one component carrier group.

According to another aspect, an embodiment of the present disclosure provides a node. The node has a function of implementing a behavior of the second node in the foregoing method embodiments. The function may be implemented by using hardware, or may be implemented by hardware executing corresponding software. The hardware or software includes one or more modules corresponding to the foregoing function.

In a possible design, a structure of the node includes a processor and a transmitter, and the processor is configured to support the second node to perform a corresponding function in the foregoing methods. The transmitter is configured to support communication between the second node and the first node. The node may further include a memory. The memory is configured to couple with the processor. The memory stores a program instruction and program data that are necessary to the node.

According to another aspect, an embodiment of the present disclosure provides another node. The node has a function of implementing a behavior of the first node in the foregoing method embodiments. The function may be implemented by using hardware, or may be implemented by hardware executing corresponding software. The hardware or software includes one or more modules corresponding to the foregoing function.

In a possible design, a structure of the node includes a processor and a transmitter, and the processor is configured to support the first node to perform a corresponding function in the foregoing methods. The transmitter is configured to support communication between the first node and the terminal device. The node may further include a memory. The memory is configured to couple with the processor. The memory stores a program instruction and program data that are necessary to the node.

According to still another aspect, an embodiment of the present disclosure provides a communications system. The system includes the resource division node, the another resource division node, and the terminal device described in the foregoing aspects.

According to yet another aspect, an embodiment of the present disclosure provides a computer storage medium, configured to store a computer software instruction used by the foregoing base station. The computer software instruction includes a program designed for executing the foregoing aspects.

According to yet another aspect, an embodiment of the present disclosure provides a computer storage medium, configured to store a computer software instruction used by the foregoing terminal device. The computer software instruction includes a program designed for executing the foregoing aspects.

Compared with the prior art, solutions provided in the present disclosure may divide a radio resource of a node, so that in a scenario in which distributed scheduling and centralized scheduling coexist, a resource conflict caused by simultaneously scheduling a same transmission resource by a plurality of nodes can be avoided.

DETAILED DESCRIPTION

Although the description is provided in the BACKGROUND by using the LTE system as an example, persons skilled in the art should know that, the present disclosure not only is applicable to the LTE system, but also may be applicable to another wireless communications system such as a Global System for Mobile communications system (GSM), a mobile telecommunications system (UMTS), or a Code Division Multiple Access (CDMA) system, and may be applicable to a new network system, and the like. Specific embodiments are described below by using the LTE system as an example.

A terminal device mentioned in the embodiments of the present disclosure may refer to a device that provides a user with voice and/or data connectivity, a handheld device with a radio connection function, or another processing device connected to a wireless modem. A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, an access point, a remote terminal, an access terminal, a user terminal, a user agent, a user device, or user equipment (UE).

A node mentioned in the embodiments of the present disclosure may be a base station, and the base station may be configured to mutually convert a received over-the-air frame and an IP packet and serve as a router between the wireless terminal and a remaining part of the access network, where the remaining part of the access network may include an Internet protocol (IP) network. The base station may further coordinate attribute management of the air interface. For example, the base station may be a base station (BTS) in the GSM or the CDMA, or may be a base station (NodeB) in WCDMA, or may be an evolved NodeB (eNB or e-NodeB, evolved Node B) in the LTE. This is not limited in this application.

A second node provided in the embodiments of the present disclosure may alternatively be a base station controller.

Figure 1:
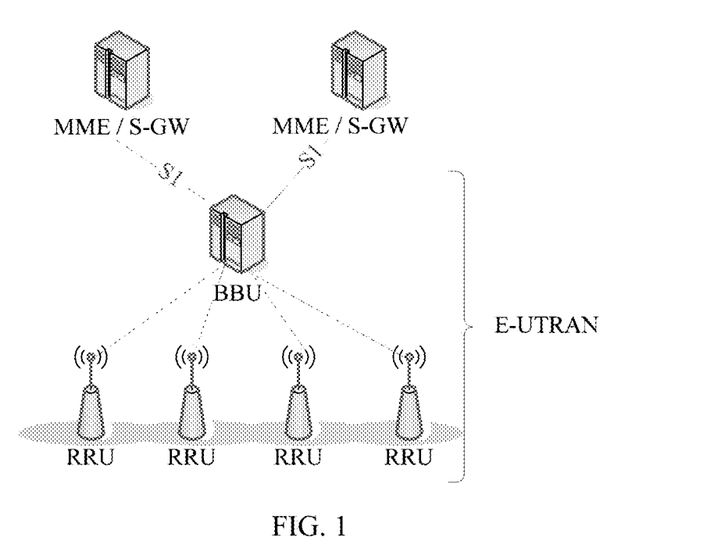
FIG. 1 is a schematic structural diagram of a centralized protocol stack architecture according to the prior art of the present disclosure.

To better describe the technical solutions of the present disclosure, a distributed protocol stack architecture and a centralized protocol stack architecture in the prior art are separately described:

As shown in FIG. 1, in a distributed protocol stack architecture, both a baseband function and a radio frequency function are placed in a base station, and the base station communicates with a terminal device based on the protocol stack shown in FIG. 1.

Figure 2:
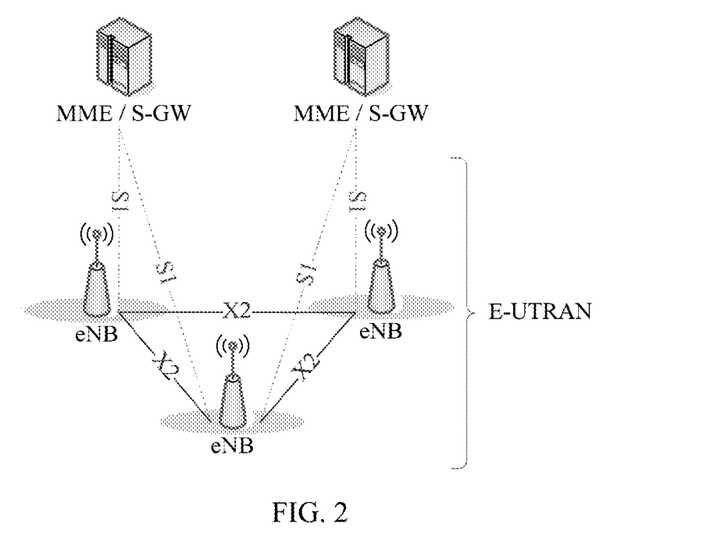
FIG. 2 is a schematic structural diagram of a distributed protocol stack architecture according to the prior art of the present disclosure.

As shown in FIG. 2, in a centralized protocol stack architecture, a base station function is placed in a baseband control unit (BBU), a radio frequency (RF) function is placed in a remote radio unit (RRU), and the BBU and the RRU are connected by using an optical fiber, to form a BBU-RRU-UE communications link.

For the prior art, in the LTE system, each time processing is performed by using a protocol stack, extra overheads are generated. Using downlink data as an example, after a base station receives data from an SGW, the base station needs to send out, by using a radio frequency module, the data after the data has been processed by a Packet Data Convergence Protocol (PDCP) layer, a Radio Link Control (RLC) layer, a Media Access Control (MAC) layer, and a PHY layer. In a centralized scheduling architecture of the LTE system, data that has been processed by PHY layer is transmitted between the BBU and the RRU, and therefore a bandwidth requirement is very high. In a distributed scheduling architecture, the BBU and the RRU are integrated as one device, and after a base station receives data from the SGW, the base station sends the data by using the radio frequency module after the data has been processed by the PDCP layer, the RLC layer, the MAC layer, and the PHY layer inside the base station. A transmission network bandwidth required is relatively small due to that an Internet Protocol (IP) layer data packet that has not been processed by the PDCP layer, the RLC layer, the MAC layer, and the PHY layer is transmitted between the SGW and an eNB.

The following describes various possible implementations in specific embodiments with reference to the accompanying drawings.

Technologies solutions described in the present disclosure may be applicable to the LTE system, or another wireless communications system that uses various wireless technical solutions. In addition, the technologies are further applicable to a subsequent evolved system in which the LTE system is used, for example, a fifth generation 5G system. To be clear, descriptions are provided herein by using only the LTE system as an example. In the LTE system, data transmission is performed between a network device and a terminal device.

It should be specially noted herein that, whether a node provided in the embodiments of the present disclosure is centralized or distributed may be preset, stipulated by a protocol, or negotiated between nodes.

To better describe the methods provided in the embodiments of the present disclosure, when a terminal device is scheduled by a first node, the scheduling is distributed scheduling, and when a terminal device is scheduled by a second node, the scheduling is centralized scheduling. This is only an example for better describing the embodiments of the present disclosure, and the present disclosure includes but is not limited to this. Certainly, the methods provided in the present disclosure may also be applicable to a scenario of a plurality of terminal devices and/or a plurality of nodes. Details are not described herein.

It should be specially emphasized that, scheduling function processing described in the present disclosure may be scheduling function processing on the MAC layer, that is, include at least one of the following functions or features: a logical information mapping function, a multiplexing function, a demultiplexing function, scheduling information reporting, priority processing, and a logical channel priority or transmission format selection function. Certainly, this is only an example for better describing the technical solutions of the present disclosure, and the present disclosure includes but is not limited to the foregoing example.

It should be specially emphasized that, the PHY layer data described in the present disclosure is PHY layer data generated after processing is performed by using at least one of the following physical layer functions:

a CRC function, a channel coding function, a HARQ processing function of the physical layer, a channel interleaving function, a scrambling code function, modulation, or a layer mapping function, and precoding function.

It should be specially noted that, the methods provided in the embodiments of the present disclosure may be applied to an application scenario of at least one terminal device, at least one first node, and at least one second node. Herein, descriptions are provided by using one first node and one second node as an example only for the convenience of description. The present disclosure includes but is not limited to the following application scenario.

Scheduling described in the embodiments of the present disclosure may include at least transmission resource allocation.

Figure 3:
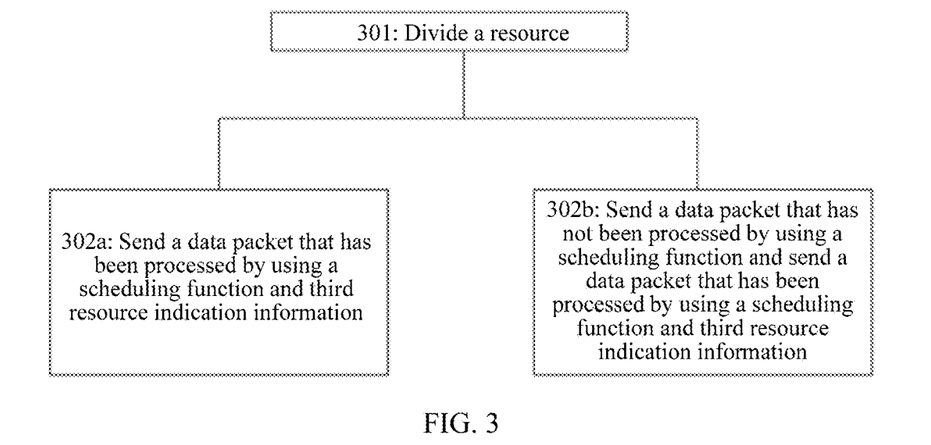
FIG. 3 is a schematic flowchart of a resource division method according to an embodiment of the present disclosure.

As shown in FIG. 3, this embodiment of the present disclosure provides a resource division method. It should be specially noted that, when a terminal device is scheduled by a first node, the scheduling is distributed scheduling, and when a terminal device is scheduled by a second node, the scheduling is centralized scheduling. The method may include the following steps.

301: The second node divides a radio resource of the first node into a first resource and a second resource.

In an example, step 301 may alternatively be: The first node divides a radio resource of the first node into a first resource and a second resource.

It should be specially noted that, the first resource is scheduled by the first node, and the second resource is scheduled by the second node.

Specifically, the second node negotiates, by using inter-node signaling with the first node, to divide the radio resource of the first node.

In an example, the first node may negotiate, by using inter-node signaling with the second node, to divide the radio resource of the first node. Specifically, the second node sends a radio resource division indication to the first node. By using this solution, centralized coordination performed by the second node can be implemented, that is, the second node coordinates a plurality of first nodes, to determine a first resource of each first node, so that it can be implemented that radio resources of the plurality of first nodes are orthogonal, thereby reducing interference. Alternatively, the first node sends a radio resource division indication to the second node. By using this solution, when the second node divides a resource, an actual running status of the first node may be considered and is used as a piece of input information, to perform the resource division more precisely.

In another example, the radio resource division indication may be used for indicating that a radio resource of a cell of the first node or the second node is divided between the first node and the second node.

For example, the radio resource division indication includes at least: a cell identifier or a node identifier of a node, and a radio resource division parameter. For example, in step 301, if the radio resource of the first node is divided, the radio resource division indication includes at least a cell identifier of the first node or an identifier of the first node, and a radio resource division parameter of the first node. Likewise, if a radio resource of the second node is divided, the radio resource division indication includes at least a cell identifier of the second node or an identifier of the second node, and a radio resource division parameter of the second node.

For example, the radio resource may include: a time domain radio resource, or a frequency domain radio resource, or a code domain radio resource.

For example, using an LTE time domain resource (subframe) as an example, a bitmap is transmitted between nodes, each bit in the bitmap indicates one subframe, and a radio resource is coordinated between the nodes by using the bitmap.

For another example, a radio resource division indication transmitted between nodes includes a reserved subframe pattern. Each bit corresponds to one subframe. Specifically, a bit whose identifier is 1 is used for indicating that a wireless network controller uses (or occupies) a radio resource corresponding to the subframe, and a bit whose identifier is 2 is used for indicating that a node uses (or occupies) a radio resource corresponding to the subframe.

It should be specially emphasized that, the radio resource of the first node may include a radio resource that includes at least one cell or at least one cell group; or includes a radio resource that includes at least one component carrier or at least one component carrier group.

For example, it is assumed that the first node supports a cell 1 and a cell 2, and the first node and the second node may negotiate that a radio resource of the cell 1 is allocated to a terminal device of the cell 1 by the first node, and a radio resource of the cell 2 of the first node is allocated to the terminal device of the cell 1 by the second node.

For another example, it is assumed that the first node supports a plurality of work carriers CC 1 and CC 2, and the first node and the second node may negotiate that, a radio resource of a cell 1 corresponding to the CC 1 of the first node is allocated to a terminal device of the cell 1 by the second node, and a radio resource corresponding to the CC 2 of the first node is allocated to the terminal device of the cell 1 by the second node.

In another example, when both the first node and the second node are a base station, the radio resource division indication may be sent by a wireless network controller to the first node or the second node. By using this solution, a radio access network controller can serve as a centralized coordination node, to effectively coordinate the resource division between the first node and the second node. Correspondingly, the first node or the second node may send an acknowledgement message to the wireless network controller, to indicate that coordination is accepted; or the first node or the second node may send a coordination message to the wireless network controller, and the coordination message carries a resource division manner suggested by the first node or the second node.

Further, before the wireless network controller sends a coordination message to the first node or a second node, the first node or the second node may send a coordination request message to the wireless network controller, to trigger the wireless network controller to send the coordination message to the first node or a second node.

302a: If determining that a terminal device is scheduled by the second node, the second node sends a data packet that has been processed by a scheduling function and third resource indication information to the first node, where the third resource by the third resource indication information is a part of or all of the second resource, and the third resource indication information is used for instructing the first node to send, after processing the data packet that has been processed by using the scheduling function, the data packet that has been processed by the first node to the terminal device by using the third resource.

By using the technical solution provided in 302a, that is, in a centralized scheduling manner, the terminal device may be scheduled in the centralized manner, and a gain of centralized scheduling can be obtained. For example, interference at an edge of a cell can be reduced.

In an example, the third resource indication information includes: radio resource configuration information allocated when the second node schedules the terminal device and a sending moment indication of the data packet that has been processed by using the scheduling function, where, by using this solution, the second node may indicate that there is a transmission delay during data transmission between the first node and the terminal device, so that quality of the data transmission can be more effectively ensured; or radio resource configuration information allocated when the second node schedules the terminal device.

For example, for the convenience of description, descriptions are provided by using three terminal devices as an example. However, the present disclosure includes but is not limited to an application scenario of at least one terminal device. Details are not described herein. A terminal device 1, a terminal device 2, and a terminal device 3 are scheduled by the second node. The terminal device 1 uses a resource 1, the terminal device 2 uses a resource 2, and the terminal device 3 uses a resource 3. A third resource sent by the second node to the first node includes resource configuration information allocated to the three terminal devices scheduled by the second node. Based on received resource use statuses of the three terminal devices, the first node may learn of a second resource, and further learn that a resource other than the second resource is a first resource. The first resource may be used for sending data of a terminal device scheduled by the first node.

For another example, descriptions are provided by using three terminal devices as an example. A terminal device 1, a terminal device 2, and a terminal device 3 are scheduled by the second node. The terminal device 1 uses a resource 1, the terminal device 2 uses a resource 2, and the terminal device 3 uses a resource 3. The second node sends third resource indication information to the first node, to notify the first node of data packet sending moments of the three terminal devices (the terminal device 1, the terminal device 2, and the terminal device 3), and resource configuration information allocated to the three terminal devices scheduled by the second node. The first node may learn of a first resource based on the third resource indication information. The first resource may be used for sending data of a terminal device scheduled by the first node. After processing a received data packet, the first node sends the data packet that has been processed by the first node to the terminal device at the sending moment notified by using the third resource indication information, and by using a third resource indicated by the third resource indication information.

For another example, the second node completes scheduling at a T3 moment, and then sends resource indication information to the first node at a time of T3+a transmission delay=a T4 moment. A first scenario is: if the transmission delay cannot be ignored (for example, a copper cable is used as a transmission medium), an indicated radio resource becomes invalid at the T4 moment. A second scenario is: if the transmission delay may be ignored (for example, an optical fiber is used as a transmission medium), an indicated radio resource is valid at the T4 moment. To resolve this problem, for the first scenario, the second node needs to perform scheduling one time unit ahead of time, and actually schedules a radio resource of a later moment. In this way, when an indicated radio resource is transmitted to the first node, the indicated radio resource is still valid. For the second scenario, a sending moment indication is not required.

In another example, the second node determines, based on basic information and/or network information of a terminal device, that the terminal device is scheduled by the first node or scheduled by the second node.

A specific determining solution is not limited in the present disclosure. All determining solutions in which the terminal device scheduling node can be determined based on the basic information and/or the network information of the terminal device fall within the protection scope of the present disclosure. To better understand the technical solutions of the present disclosure, content included in the basic information and the network information of the terminal device that are provided in the embodiments of the present disclosure is not limited to the following example. All content that can be used as a basis for determining the scheduling node falls within the protection scope required by the present disclosure. Specifically, the basic information of the terminal device includes but is not limited to: a geographical location of the terminal device, service QoS information, a measurement report, a terminal capability, or priority information of the terminal device. The network information may include load information of a transmission network, a load status of the transmission network, a hardware resource load status, or comprehensive load information, that is, information such as the hardware load status and the network load status is considered. For a specific determining step, refer to the foregoing descriptions, and details are not described herein again.

For example, for how to determine a scheduling node of a terminal device, the determining that the terminal device is scheduled by the first node or determining that the terminal device is scheduled by the second node may be performed based on any one of the following conditions:

condition 1: when a geographical location of the terminal device is at an edge of a cell, the terminal device is scheduled by the second node, or when a geographical location of the terminal device is not at an edge of a cell, the terminal device is scheduled by the first node; or condition 2: when signal strength of a serving cell is less than a first threshold or signal strength of a neighboring cell is greater than a second threshold in a measurement report, the terminal device is scheduled by the second node, or when signal strength of a serving cell is greater than a first threshold or signal strength of a neighboring cell is less than a second threshold in a measurement report, the terminal device is scheduled by the first node; or condition 3: when a capability of the terminal device supports COMP, the terminal device is scheduled by the second node, or when a capability of the terminal device does not support COMP, the terminal device is scheduled by the first node; or condition 4: when load of a Fronthaul transmission network is light, the terminal device is scheduled by the second node, or when load of a Fronthaul transmission network is heavy, the terminal device is scheduled by the first node.

For example, a scheduling node of a terminal device may alternatively be determined based on a first condition and a second condition:

The first condition includes any one of the following conditions:

condition 1: when a geographical location of a terminal device is at an edge of a cell, the terminal device is scheduled by the second node, or when a geographical location of a terminal device is not at an edge of a cell, the terminal device is scheduled by the first node; or condition 2: when signal strength of a serving cell is less than a first threshold or signal strength of a neighboring cell is greater than a second threshold in a measurement report, the terminal device is scheduled by the second node, or when signal strength of a serving cell is greater than a first threshold or signal strength of a neighboring cell is less than a second threshold in a measurement report, the terminal device is scheduled by the first node; or condition 3: when a capability of the terminal device supports COMP, the terminal device is scheduled by the second node, or when a capability of the terminal device does not support COMP, the terminal device is scheduled by the first node;

The second condition may include, for example, when load of a Fronthaul transmission network is light, the terminal device is scheduled by the second node, or when load of a Fronthaul transmission network is heavy, the terminal device is scheduled by the first node. This is only an example used in the present disclosure, and the present disclosure includes but is not limited to this.

In another example, if the terminal device is scheduled by the second node, that the second node performs scheduling processing on the received data (for example, downlink data) may include: after performing IP layer processing, PDCP layer processing, RLC layer processing, and MAC layer scheduling processing on the data, the second node sends a MAC PDU and third resource indication information to the first node; or after performing IP layer processing, PDCP layer processing, RLC layer processing, MAC layer scheduling processing, and PHY layer processing on the received data (for example, downlink data), the second node sends PHY layer data and third resource indication information to the first node.

In another example, the MAC PDU sent by the second node to the first node may be a MAC PDU that has been processed by a MAC layer scheduling function.

302b: If the terminal device is scheduled by the first node, the second node sends a data packet that has not been processed by a scheduling function to the first node, where after processing the data packet that has not been processed by using the scheduling function, the first node sends the data packet that has been processed by the first node to the terminal device by using a fourth resource, and the fourth resource is a part of or all of the first resource.

By using the technical solution provided in 302b, that is, in a distributed scheduling manner, a bandwidth requirement of a transmission network can be reduced.

For example, if the terminal device is scheduled by the first node, after performing IP layer processing and PDCP layer processing on received data, the second node sends a PDCP PDU to the first node. The first node receives the PDCP PDU sent by the second node. After performing MAC layer scheduling function processing and PHY layer processing on and then performing radio frequency processing on the PDCP PDU, the first node sends the PDCP PDU to the terminal device by using the fourth resource. Alternatively, after performing IP layer processing on received data, the second node generates an IP PDU, and sends the IP PDU to the first node. After the first node receives the IP PDU sent by the second node, the first node performs PDCP layer processing, RLC layer processing, MAC layer scheduling function processing, and PHY layer processing on the IP PDU. After performing radio frequency function processing on the IP PDU, the first node sends the IP PDU to the terminal device by using the fourth resource.

Figure 4:
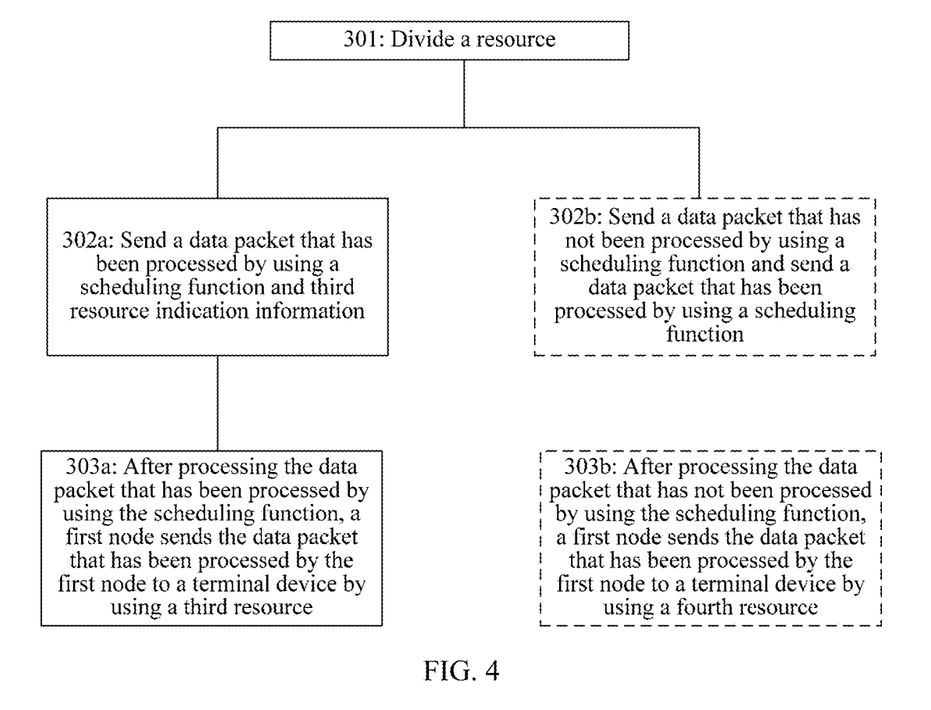
FIG. 4 is a schematic flowchart of another resource division method according to an embodiment of the present disclosure.

303a: As shown in FIG. 4, if it is determined that a terminal device is scheduled by the second node, the first node receives a data packet that has been processed by a scheduling function and third resource indication information, where the data packet and the third resource indication information are sent by the second node, and a third resource indicated by the third resource indication information is a part of or all of the second resource, and after processing the data packet that has been processed by using the scheduling function, the first node sends the data packet that has been processed by the first node to the terminal device by using the third resource indicated by the third resource indication information.

For example, after the first node receives the third resource indication information, the first node determines the first resource based on the third resource indication information.

For example, after the first node receives a MAC PDU sent by the second node, after performing physical layer processing on and then performing radio frequency processing on the MAC PDU, the first node sends the MAC PDU to the terminal device by using the third resource indicated by the third resource indication information.

For example, after the first node receives PHY layer data sent by the second node, after performing radio frequency processing on the PHY layer data, the first node sends the PHY layer data to the terminal device by using the third resource indicated by the third resource indication information.

For example, after the first node receives a MAC PDU on which the MAC layer scheduling function processing has been performed, after performing MAC layer HARQ function processing on and then performing PHY layer processing and radio frequency function processing on the MAC PDU, the first node sends the MAC PDU to the terminal device by using the third resource indicated by the third resource indication information.

Figure 5:
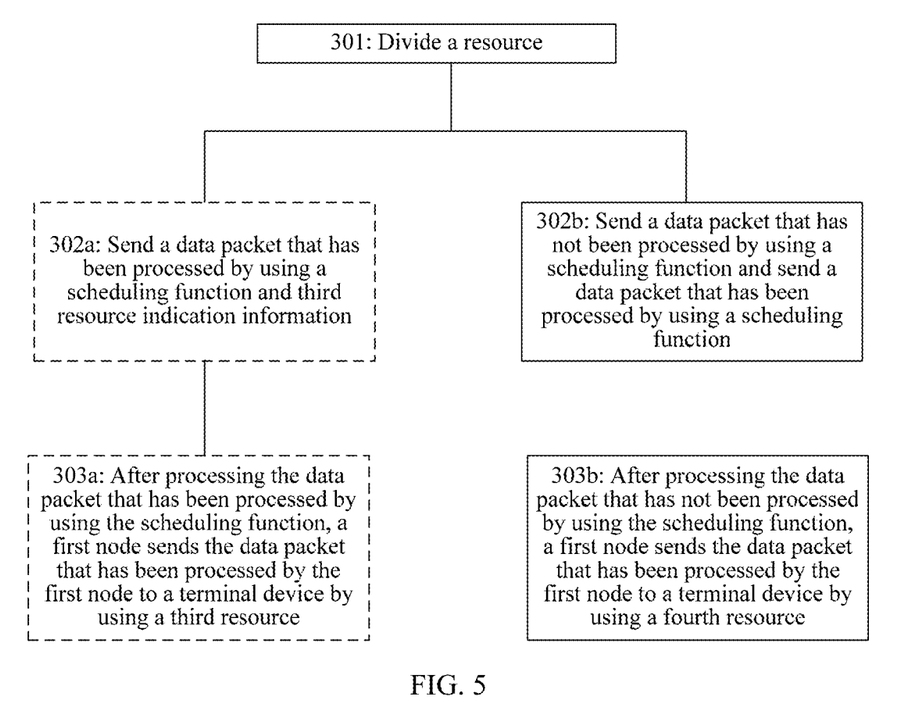
FIG. 5 is a schematic flowchart of another resource division method according to an embodiment of the present disclosure.

303b: As shown in FIG. 5, if the terminal device is scheduled by the first node, the first node receives a data packet that has not been processed by a scheduling function and that is sent by the second node, and after processing the data packet that has not been processed by using the scheduling function, the first node sends the data packet that has been processed by the first node to the terminal device by using a fourth resource, and the fourth resource is a part of or all of the first resource.

For example, after the first node receives an IP PDU, after performing PDCP layer processing, MAC layer scheduling function processing, and PHY layer processing on and then performing radio frequency processing on the IP PDU, the first node sends the IP PDU to the terminal device by using the third resource indicated by the third resource indication information.

For example, after the first node receives a PDCP PDU, after performing MAC layer scheduling function processing and PHY layer processing on and then performing radio frequency function processing on the PDCP PDU, the first node sends the PDCP PDU to the terminal device by using the third resource indicated by the third resource indication information.

In this embodiment of the present disclosure, the second node divides a radio resource of the first node into the first resource and the second resource, the first resource is scheduled by the first node, and the second resource is scheduled by the second node, thereby avoiding a conflict caused by scheduling a same resource by the two nodes, and reducing power consumption.

In another example, when the basic information of the terminal device changes or the network information of the second node or the first node changes, the first node negotiates with the second node to redivide the radio resource of the first node. For a specific division method, refer to the foregoing descriptions, and details are not described herein again. By using this technical solution, a running status of the network and a service requirement of the terminal device can be dynamically adapted to.

It should be specially noted that, step 302a and step 302b in this embodiment of the present disclosure are two parallel branches, and 303a and 303b are also two parallel branches.

Figure 6:
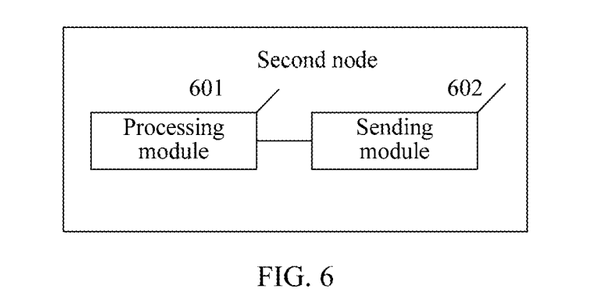
FIG. 6 is a schematic structural diagram of a node according to an embodiment of the present disclosure.

FIG. 6 shows a resource division node according to an embodiment of the present disclosure. The node is one of a plurality of nodes. Both the node and a first node have a scheduling function. The node is configured to perform the functions performed by the second node in the foregoing method embodiments. The node includes a processing module 601 and a sending module 602.

The processing module 601 is configured to divide a radio resource of the first node into a first resource and a second resource.

For a specific division method, refer to the foregoing method embodiments, and details are not described herein again.

The processing module 601 is configured to determine that a terminal device is scheduled by the second node or scheduled by the first node.

For a specific determining method, refer to the foregoing method embodiments, and details are not described herein again.

The sending module 602 is configured to: when the processing module 601 determines that the terminal device is scheduled by the second node, send a data packet that has been processed by using the scheduling function and third resource indication information to the first node, where a third resource indicated by the third resource indication information is a part of or all of the second resource obtained through the division by the processing module 601, and the third resource indication information is used for instructing the first node to send, after processing the data packet that has been processed by using the scheduling function, the data packet that has been processed by the first node to the terminal device by using the third resource indicated by the third resource indication information; or is configured to: when the processing module 601 determines that the terminal device is scheduled by the first node, send a data packet that has not been processed by using the scheduling function to the first node, where after processing the data packet that has not been processed by using the scheduling function, the first node sends the data packet that has been processed by the first node to the terminal device by using a fourth resource, and the fourth resource is a part of or all of the first resource.

When the technical solution described in the foregoing is used, for example, when a centralized scheduling manner is used, the terminal device may be scheduled in the centralized manner, and a gain of centralized scheduling can be obtained. For example, interference at an edge of a cell can be reduced. When a distributed scheduling manner is used, a bandwidth requirement of a transmission network can be reduced.

In an example, the processing module 601 is further configured to: when basic information of the terminal device changes or network information of the second node or the first node changes, negotiate with the first node to divide a radio resource of the first node. In this way, a running status of the network and a service requirement of the terminal device can be dynamically adapted to.

For a specific division method, refer to the foregoing method embodiments.

In another example, the third resource indication information sent by the sending module 602 includes: radio resource configuration information allocated when the terminal device is scheduled; or radio resource configuration information allocated when the terminal device is scheduled and a sending moment indication of the data packet that has been processed by using the scheduling function. In this way, the second node may indicate that there is a transmission delay during data transmission between the first node and the terminal device, so that quality of the data transmission can be more effectively ensured.

For example, the terminal device in this embodiment may be one or more.

In another example, the processing module 601 is specifically configured to negotiate, by using inter-node signaling with the first node, to divide the radio resource of the first node. In this way, resource division between nodes can be dynamically coordinated.

In another example, the inter-node information includes a radio resource division indication, the radio resource division indication includes a cell identifier or a node identifier of the node for which division is to be performed, and a radio resource division parameter, and the radio resource includes a time domain radio resource, a frequency domain radio resource, or a code domain radio resource.

In another example, the radio resource of the first node includes a radio resource that includes at least one cell or at least one cell group; or includes a radio resource that includes at least one component carrier or at least one component carrier group.

It should be specially noted that, in this embodiment of the present disclosure, a physical device corresponding to the processing module 601 is a processor, and a physical device corresponding to the sending module 602 is a transmitter.

Figure 7:
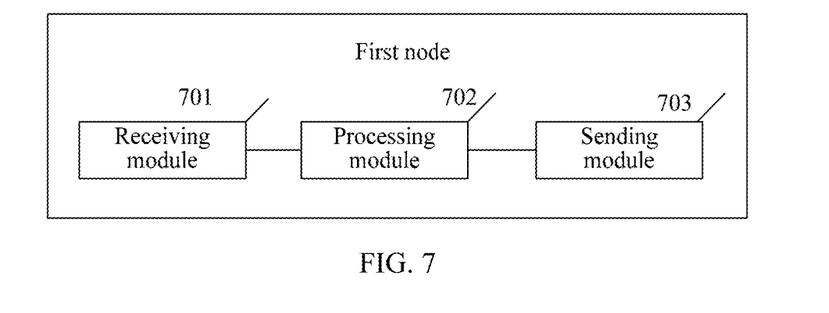
FIG. 7 is a schematic structural diagram of another node according to an embodiment of the present disclosure.

FIG. 7 shows a resource division node according to an embodiment of the present disclosure. Both the node and a second node have a scheduling function. The node is configured to perform the functions performed by the first node in the foregoing method embodiments. The method includes:

a receiving module 701, configured to: when it is determined that a terminal device is scheduled by the second node, receive a data packet that has been processed by using the scheduling function and third resource indication information, where the data packet and the third resource indication information are sent by the second node, and a third resource indicated by the third resource indication information is a part of or all of the second resource;

a processing module 702, configured to process the data packet that has been processed by using the scheduling function and that is received by the receiving module 701; and a sending module 703, configured to send the data packet that has been processed by the processing module to the terminal device by using the third resource that is indicated by the third resource indication information and that is received by the receiving module 701, or the receiving module 701 is configured to receive a data packet that has not been processed by using the scheduling function and that is sent by the second node;

the processing module 702 is configured to process the data packet that has not been processed by using the scheduling function and that is received by the receiving module 701; and the sending module 703 is configured to send the data packet that has been processed by the processing module 702 to the terminal device by using a fourth resource, where the fourth resource is a part of or all of the first resource.

When the technical solution described in the foregoing is used, for example, when a centralized scheduling manner is used, the terminal device may be scheduled in the centralized manner, and a gain of centralized scheduling can be obtained. For example, interference at an edge of a cell can be reduced. When a distributed scheduling manner is used, a bandwidth requirement of a transmission network can be reduced.

In an example, the processing module 702 is further configured to: when basic information of the terminal device changes or network information of the second node or the first node changes, negotiate with the second node, to divide a radio resource of the first node. In this way, a running status of the network and a service requirement of the terminal device can be dynamically adapted to.

In another example, the processing unit 702 is further configured to: after the receiving module 701 receives the third resource indication information, determine the first resource based on the third resource indication information. In this way, by using the first resource, the first node may send data to a terminal device scheduled by the first node, thereby avoiding a conflict caused by scheduling a same transmission resource by different nodes.

In another example, the processing module 702 is further configured to negotiate, by using inter-node signaling with the second node, to divide the radio resource of the first node. In this way, a running status of the network and a service requirement of the terminal device can be dynamically adapted to.

In another example, the inter-node signaling includes radio resource division indication, the radio resource division indication includes a cell identifier or a node identifier of the node for which division is to be performed, and a radio resource division parameter, and the radio resource includes a time domain radio resource, a frequency domain radio resource, or a code domain radio resource.

In another example, the radio resource of the first node includes a radio resource that includes at least one cell or at least one cell group; or includes a radio resource that includes at least one component carrier or at least one component carrier group.

It should be specially noted that, in this embodiment of the present disclosure, a physical device corresponding to the processing module 702 is a processor, a physical device corresponding to the receiving module 701 is a receiver, and a physical device corresponding to the sending module 703 is a transmitter.

Figure 8:
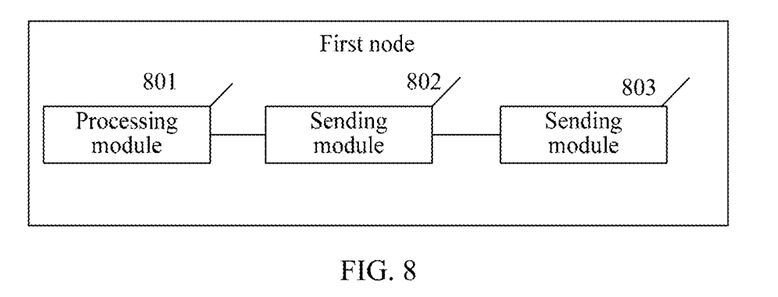
FIG. 8 is a schematic structural diagram of another node according to an embodiment of the present disclosure.

FIG. 8 shows a resource division node according to an embodiment of the present disclosure. Both the node and a second node have a scheduling function. The node is configured to perform the functions performed by the first node in the foregoing method embodiments. The node includes a processing module 801, a receiving module 802, and a sending module 803.

The processing module 801 is configured to divide a radio resource of the first node into a first resource and a second resource.

For a specific division method, refer to the foregoing method embodiments.

The receiving module 802 is configured to determine that a terminal device is scheduled by the first node, where the first node receives a data packet that has not been processed by using the scheduling function and that is sent by the second node.

The processing module 801 is configured to perform scheduling function processing on the data packet that has not been processed by using the scheduling function and that is received by the receiving module 802.

The sending module 803 is configured to send data that has been processed by the processing module 801 to the terminal device by using a resource indicated by third resource indication information, where the third resource is a part of or all of the third resource.

Alternatively, the receiving module 802 is configured to: if the terminal device is scheduled by the second node, receive a data packet that has been processed by using the scheduling function and fourth resource indication information, where the data packet and the fourth resource indication information are sent by the second node, and a fourth resource indicated by the fourth resource indication information is a part of or all of the second resource;

the processing module 801 is configured to process the data that has been processed by using the scheduling function and that is received by the receiving module 802; and the sending module 803 is configured to send the data packet that has been processed by the first node to the terminal device by using the fourth resource that is indicated by the fourth resource indication information and that is received by the receiving module 802.

When the technical solution described in the foregoing is used, for example, when a centralized scheduling manner is used, the terminal device may be scheduled in the centralized manner, and a gain of centralized scheduling can be obtained. For example, interference at an edge of a cell can be reduced. When a distributed scheduling manner is used, a bandwidth requirement of a transmission network can be reduced.

In an example, the processing module 801 is further configured to: when basic information of the terminal device changes or network information of the second node or the first node changes, negotiate with the second node to divide the radio resource of the first node. In this way, a running status of the network and a service requirement of the terminal device can be dynamically adapted to.

In another example, the fourth resource indication information received by the receiving module 802 includes: radio resource configuration information allocated when the second node schedules the terminal device and a sending moment indication of the data packet that has been processed by using the scheduling function; or radio resource configuration information allocated when the second node schedules the terminal device. In this way, the second node may indicate that there is a transmission delay during data transmission between the first node and the terminal device, so that quality of the data transmission can be more effectively ensured.

In another example, the processing module 801 is specifically configured to negotiate, by using inter-node signaling with the second node, to divide the radio resource of the first node. In this way, by using this method, resource division between nodes can be dynamically coordinated.

In another example, the inter-node signaling includes a radio resource division indication, the radio resource division indication includes a cell identifier or a node identifier of the node for which division is to be performed, and a radio resource division parameter, and the radio resource includes a time domain radio resource, a frequency domain radio resource, or a code domain radio resource.

In another example, the radio resource includes a radio resource that includes at least one cell or at least one cell group; or includes a radio resource that includes at least one component carrier or at least one component carrier group.

It should be specially noted that, in this embodiment of the present disclosure, a physical device corresponding to the processing module is a processor, a physical device corresponding to the receiving module is a receiver, and a physical device corresponding to the sending module is a transmitter.

Figure 9:
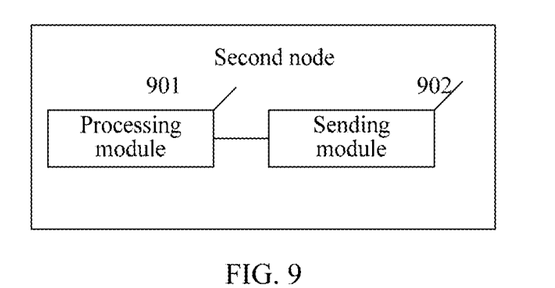
FIG. 9 is a schematic structural diagram of another node according to an embodiment of the present disclosure.

FIG. 9 shows a resource division node according to an embodiment of the present disclosure. Both the node and a second node have a scheduling function. The node is configured to perform the functions performed by the second node in the foregoing method embodiments. The node includes:

a processing module 901, configured to divide a radio resource of a first node into a first resource and a second resource; and a sending module 902, configured to: if it is determined that a terminal device is scheduled by the first node, send, by the second node, a data packet that has not been processed by using the scheduling function to the first node, where after performing scheduling function processing on the data packet that has not been processed by using the scheduling function, the first node sends the data packet that has been processed by the first node to the terminal device by using a third resource, where the third resource is a part of or all of the first resource obtained through the division by the processing module 901; or if the terminal device is scheduled by the second node, send, by the second node, a data packet that has been processed by using the scheduling function and fourth resource indication information to the first node, where the fourth resource indication information is used for instructing the first node to send, by using a fourth resource, after processing the data packet that has been processed by using the scheduling function, the data packet that has been processed by the first node, and the fourth resource indicated by the fourth resource indication information is a part of or all of the second resource obtained through the division by the processing module 901.

When the technical solution described in the foregoing is used, for example, when a centralized scheduling manner is used, the terminal device may be scheduled in the centralized manner, and a gain of centralized scheduling can be obtained. For example, interference at an edge of a cell can be reduced. When a distributed scheduling manner is used, a bandwidth requirement of a transmission network can be reduced.

In an example, the processing module is further configured to: when basic information of the terminal device changes or network information of the second node or the first node changes, negotiate with the first node to divide the radio resource of the first node. In this way, a running status of the network and a service requirement of the terminal device can be dynamically adapted to.

In another example, the processing module 901 is further configured to: after the receiving module receives the fourth resource indication information, determine the first resource based on the resource indicated by the fourth resource indication information. In this way, the first node may send, by using the first resource, data to the terminal device scheduled by the first node.

In another example, the processing module 901 is specifically configured to negotiate, by the second node, by using inter-node signaling with the first node, to divide the radio resource of the first node. In this way, resource division between nodes can be dynamically coordinated.

In another example, the inter-node signaling may include a radio resource division indication, the radio resource division indication includes a cell identifier or a node identifier of the node for which division is to be performed, and a radio resource division parameter, and the radio resource includes a time domain radio resource, a frequency domain radio resource, or a code domain radio resource.

In another example, the radio resource of the first node includes a radio resource that includes at least one cell or at least one cell group; or includes a radio resource that includes at least one component carrier or at least one component carrier group.

It should be specially noted that, in this embodiment of the present disclosure, a physical device corresponding to the processing module 901 is a processor, and a physical device corresponding to the sending module 902 is a transmitter.

It should be specially noted that, the terminal device provided in the apparatus embodiments in FIG. 6 to FIG. 9 may be one or more.

It should be specially noted that, for beneficial effects of the apparatus embodiments in FIG. 6 to FIG. 9, refer to the foregoing method embodiments.

It should be specially noted that, for specific processing methods for the data packet that has been processed by using the scheduling function, the data packet that has not been processed by using the scheduling function, and the data packet that has been processed by the first node, where the data packets are provided in the apparatus embodiments in FIG. 6 to FIG. 9, refer to the foregoing method embodiments.

For the resource division methods provided in the apparatus embodiments in FIG. 6 to FIG. 9, also refer to the foregoing method embodiments.

An embodiment of the present disclosure further provides a resource division system, including at least one terminal device, at least one node shown in FIG. 6, and at least one node shown in FIG. 7.

An embodiment of the present disclosure further provides a resource division system, including at least one terminal device, at least one node shown in FIG. 8, and at least one node shown in FIG. 9.

The methods or algorithm steps described with reference to the content disclosed in the present disclosure may be implemented in a hardware manner, or may be implemented in a manner of executing a software instruction by a processor. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, alternatively, the storage medium may be a part of the processor. The processor and the storage medium may be located in an ASIC. In addition, the ASIC may be located in the user equipment. Certainly, the processor and the storage medium may also exist in the user equipment as discrete components.

Persons skilled in the art should be aware that in one or more of the foregoing examples, the functions described in the present disclosure may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made based on the principle of the technical solutions of the present disclosure shall fall within the protection scope of the present disclosure.

What is claimed is:

1. A resource division method performed in a network comprising at least one terminal device, at least one first node, and at least one second node, wherein both the first node and the second node have a scheduling function, the method comprising:
   dividing, by the second node, a radio resource of the first node into a first resource and a second resource, wherein the first resource is scheduled by the first node, and wherein the second resource is scheduled by the second node;
   when determining that the terminal device is scheduled by the second node, sending, by the second node, a data packet that has been processed by using the scheduling function and third resource indication information to the first node, wherein a third resource indicated by the third resource indication information is a part of or all of the second resource, and the third resource indication information is configured to instruct the first node to send, after processing the data packet that has been processed by using the scheduling function, the data packet that has been processed by the first node to the terminal device by using the third resource; or
   when the terminal device is scheduled by the first node, sending, by the second node, a data packet that has not been processed by using the scheduling function to the first node, wherein after processing the data packet that has not been processed by using the scheduling function, the first node sends the data packet that has been processed by the first node to the terminal device by using a fourth resource, and the fourth resource is a part of or all of the first resource.

2. The method according to claim 1, further comprising:
   when basic information of the terminal device changes or network information of the second node or the first node changes, negotiating, by the second node with the first node, to divide the radio resource of the first node.

3. The method according to claim 1, wherein the third resource indication information comprises:
   radio resource configuration information allocated when the second node schedules the terminal device and a sending moment indication of the data packet that has been processed by using the scheduling function; or
   radio resource configuration information allocated when the second node schedules the terminal device.

4. The method according to claim 1, wherein dividing, by the second node, a radio resource of the first node into a first resource and a second resource comprises:
   negotiating, by the second node by using inter-node signaling with the first node, to divide the radio resource of the first node.

5. The method according to claim 4, wherein negotiating, by the second node by using inter-node signaling with the first node, to divide the radio resource of the first node comprises:
   sending, by the second node, a radio resource division indication to the first node; or
   receiving, by the second node, a radio resource division indication sent by the first node; or
   forwarding, by the second node to the first node, a radio resource division indication sent by a radio access network controller.

6. A resource division method performed in a network comprising at least one terminal device, at least one first node, and at least one second node, wherein both the first node and the second node have a scheduling function, and the method comprises:
   when it is determined that the terminal device is scheduled by the second node:
      receiving, by the first node, a data packet that has been processed by using the scheduling function and third resource indication information, wherein the data packet and the third resource indication information are sent by the second node, wherein a third resource indicated by the third resource indication information is a part of or all of a second resource, wherein a radio resource of the first node is divided into a first resource and the second resource, wherein the first resource is scheduled by the first node, and wherein the second resource is scheduled by the second node; and
      after processing the data packet that has been processed by using the scheduling function, sending, by the first node, the data packet that has been processed by the first node to the terminal device by using the third resource indicated by the third resource indication information; or
   when the terminal device is scheduled by the first node:
      receiving, by the first node, a data packet that has not been processed by using the scheduling function and that is sent by the second node; and
      after processing the data packet that has not been processed by using the scheduling function, sending, by the first node, the data packet that has been processed by the first node to the terminal device by using a fourth resource, wherein the fourth resource is a part of or all of the first resource.

7. The method according to claim 6, further comprising:
   when basic information of the terminal device changes or network information of the second node or the first node changes, negotiating, by the first node with the second node, to divide the radio resource of the first node.

8. The method according to claim 6, wherein after receiving, by the first node, third resource indication information, the method further comprises:
   determining, by the first node, the first resource based on the third resource indication information.

9. The method according to claim 6, further comprising:
negotiating, by the first node by using inter-node signaling with the second node, to divide the radio resource of the first node.

10. The method according to claim 9, further comprising:
receiving, by the first node, a radio resource division indication sent by the second node; or
sending, by the first node, a radio resource division indication to the second node.

11. A resource division node, wherein both the node and a first node have a scheduling function, and the node comprises:
a processor, configured to:
divide a radio resource of the first node into a first resource and a second resource, wherein the first resource is scheduled by the first node, and wherein the second resource is scheduled by the node; and
determine that a terminal device is scheduled by the node or scheduled by the first node; and
a transmitter, configured to:
when the processor determines that the terminal device is scheduled by the node, send a data packet that has been processed by using the scheduling function and third resource indication information to the first node, wherein a third resource indicated by the third resource indication information is a part of or all of the second resource obtained through the division by the processor, and the third resource indication information is configured to instruct the first node to send, after processing the data packet that has been processed by using the scheduling function, the data packet that has been processed by the first node to the terminal device by using the third resource; or
when the processor determines that the terminal device is scheduled by the first node, send a data packet that has not been processed by using the scheduling function to the first node, wherein after processing the data packet that has not been processed by using the scheduling function, the first node sends the data packet that has been processed by the first node to the terminal device by using a fourth resource, and the fourth resource is a part of or all of the first resource.

12. The node according to claim 11, wherein the processor is further configured to:
when basic information of the terminal device changes or network information of the node or the first node changes, negotiate with the first node to divide the radio resource of the first node.

13. The node according to claim 11, wherein the third resource indication information sent by the transmitter comprises:
radio resource configuration information allocated when the terminal device is scheduled and a sending moment indication of the data packet that has been processed by using the scheduling function; or
radio resource configuration information allocated when the terminal device is scheduled.

14. The node according to claim 11, wherein the processor is configured to negotiate, by using inter-node signaling with the first node, to divide the radio resource of the first node.

15. The node according to claim 14, wherein:
the inter-node signaling comprises a radio resource division indication;
the radio resource division indication comprises a cell identifier or a node identifier of the node for which division is to be performed, and a radio resource division parameter; and
the radio resource comprises a time domain radio resource, a frequency domain radio resource, or a code domain radio resource.

16. A resource division node, wherein both the node and a second node have a scheduling function, and the resource division node comprises:
a receiver, configured to:
when it is determined that a terminal device is scheduled by the second node, receive a data packet that has been processed by using the scheduling function and third resource indication information, wherein the data packet and the third resource indication information are sent by the second node, wherein a third resource indicated by the third resource indication information is a part of or all of a second resource, wherein a radio resource of the node is divided into a first resource and the second resource, wherein the first resource is scheduled by the node, and wherein the second resource is scheduled by the second node;
a processor, configured to process the data packet that has been processed by using the scheduling function and that is received by the receiver; and
a transmitter, configured to send the data packet that has been processed by the processor to the terminal device by using the third resource that is indicated by the third resource indication information and that is received by the receiver; or
the receiver is configured to receive a data packet that has not been processed by using the scheduling function and that is sent by the second node;
the processor is configured to process the data packet that has not been processed by using the scheduling function and that is received by the receiver; and
the transmitter is configured to send the data packet that has been processed by the processor to the terminal device by using a fourth resource, wherein the fourth resource is a part of or all of a first resource.

17. The node according to claim 16, wherein the processor is further configured to:
when basic information of the terminal device changes or network information of the second node or the node changes, negotiate, by the node with the second node, to divide the radio resource of the node.

18. The node according to claim 16, wherein the processor is further configured to:
after the receiver receives the third resource indication information, determine the first resource based on the third resource indication information.

19. The node according to claim 16, wherein the processor is further configured to:
negotiate, by using inter-node signaling with the second node, to divide the radio resource of the node.

20. The node according to claim 19, wherein:
the inter-node signaling comprises a radio resource division indication;
the radio resource division indication comprises a cell identifier or a node identifier of the node for which division is to be performed, and a radio resource division parameter; and
the radio resource comprises a time domain radio resource, a frequency domain radio resource, or a code domain radio resource.

* * * * *